United States Patent
Kuramochi (10) Patent No.: US 9,434,404 B2
(45) Date of Patent: *Sep. 6, 2016

(54) VEHICLE STEERING DEVICE

(71) Applicant: HONDA MOTOR CO., LTD., Tokyo (JP)

(72) Inventor: Toshikatsu Kuramochi, Wako (JP)

(73) Assignee: HONDA MOTOR CO., LTD. (HGT), Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,372

(22) Filed: Mar. 2, 2015

(65) Prior Publication Data
US 2015/0246683 A1   Sep. 3, 2015

(30) Foreign Application Priority Data
Mar. 3, 2014  (JP) ................................. 2014-040596

(51) Int. Cl.
*B62D 5/00*     (2006.01)
*B62D 5/04*     (2006.01)

(52) U.S. Cl.
CPC .............. *B62D 5/003* (2013.01); *B62D 5/006* (2013.01); *B62D 5/0484* (2013.01); *B62D 5/0487* (2013.01)

(58) Field of Classification Search
CPC .. B62D 5/003; B62D 5/0484; B62D 5/0487; B62D 5/006
See application file for complete search history.

(56) References Cited

U.S. PATENT DOCUMENTS

2007/0205040 A1* 9/2007 Miyasaka ............... B62D 5/001
                                                                  180/444
2013/0285587 A1* 10/2013 Takemoto ............ B62D 5/0496
                                                                  318/473

FOREIGN PATENT DOCUMENTS

JP          2003-252227 A       9/2003

* cited by examiner

*Primary Examiner* — Yuen Wong
(74) *Attorney, Agent, or Firm* — Westerman, Hattori, Daniels & Adrian, LLP (57) ABSTRACT

A vehicle steering device includes a steering reaction force generating device having a steering reaction force motor; a steering device having a steering motor; a clutch device having an electromagnetic solenoid that sets the steering reaction force generating device and the steering device in a mechanically engaged or disengaged state; a current integrated value acquisition unit that obtains an integrated value of a current of one of the steering reaction force and steering motors; an overload state determination unit that determines whether or not the one motor is in an overload state based on the integrated value of the current supplied to the one motor, obtained by the current integrated value acquisition unit; and a drive control unit that controls driving of the electromagnetic solenoid to set the clutch device in an engaged state when the overload state determination unit determines that the one motor is in an overload state.

3 Claims, 2 Drawing Sheets

VEHICLE STEERING DEVICE

CROSS REFERENCES TO RELATED APPLICATIONS

The present application claims priority under 35 U.S.C. §119 to Japanese Patent Application No. 2014-040596, filed Mar. 3, 2014, entitled "Vehicle Steering Device." The contents of this application are incorporated herein by reference in their entirety.

BACKGROUND

1. Field

The present disclosure relates to a steer-by-wire type vehicle steering device.

2. Description of the Related Art

Recently, a steering device of a type called steer-by-wire has been developed. Japanese Unexamined Patent Application Publication (JP-A) No. 2003-252227 discloses a steer-by-wire (SBW) type vehicle steering device.

In the SBW type vehicle steering device according to JP-A No. 2003-252227, a clutch device is interposed between a column shaft that is rotated according to an operation of the steering wheel and a transmission shaft that is rotated according to an operation of a steering mechanism to engage or disengage the connection therebetween. The steering control unit determines whether or not a steering motor is in an overload state based on the drive state (motor current and motor temperature) of the steering motor that steers turning wheels. In the case where the steering motor is determined to be in an overload state, the steering control unit switches the state of the clutch device from a disengaged state to an engaged state, thereby mechanically transmitting an operation force to the steering mechanism to perform steering, the operation force being applied to the steering wheel.

With the SBW type vehicle steering device according to JP-A No. 2003-252227, an occurrence of an overload in the steering motor may be reliably restrained.

In the SBW type vehicle steering device according to JP-A No. 2003-252227, in the case where a value for motor current (correlation value of a motor temperature) continues to exceed a predetermined threshold value for a predetermined time, the steering motor is determined to be in an overload state based on the motor current (or the motor temperature) supplied to the steering motor, and the state of the clutch device is switched from a disengaged state to an engaged state.

However, with the above-described configuration, in the case where an event, in which the motor current value (the motor temperature correlation value) exceeds the predetermined threshold value, occurs continuously and each event has a time period slightly shorter than the predetermined time, it is erroneously determined that the steering motor is not in an overload state although the steering motor is actually in an overload state. Consequently, timing for switching the state of the clutch device from a disengaged state to an engaged state is delayed with respect to proper switching timing, and thus the overload state of the steering motor may be prolonged.

Particularly, when determination is made based on the value of a motor temperature as to whether or not the steering motor is in an overload state, a temperature sensor such as a thermistor needs to be separately provided. Therefore, the number of components and the cost are increased.

It is to be noted that reliable determination as to whether or not a motor is in an overload state is demanded of not only the steering motor but also the steering reaction force motor.

SUMMARY

The present disclosure has been made in view of the above-described problems and provides a vehicle steering device capable of reliably determining whether or not a motor related to steering of the vehicle is in an overload state.

In order to solve the problems, a first aspect of the disclosure provides a vehicle steering device including: a steering unit that has a steering reaction force motor capable of applying a steering reaction force to a steering member which is operated when a turning wheel of a vehicle is turned; a steering unit that has a steering motor that applies a steering force for steering the turning wheel, the steering motor being capable of steering the turning wheel in a state where the steering unit is mechanically separated from the steering unit; a clutch device that has a switching actuator that sets the steering unit and the steering unit in a mechanically engaged state or disengaged state; a current integrated value acquisition unit that obtains an integrated value of a current supplied to one of the steering reaction force motor and the steering motor; an overload state determination unit that determines whether or not the one motor is in an overload state based on the integrated value of the current supplied to the one motor, obtained by the current integrated value acquisition unit; and a control unit that controls driving of the steering motor to cause an actual steering angle of the turning wheel to follow at least a target steering angle which is calculated based on a steering angle of the steering member, and controls driving of the switching actuator to set the clutch device in an engaged state when the overload state determination unit determines that the one motor is in an overload state. In another aspect of the disclosure, a method of controlling a vehicle steering device described above is provided. The method includes the steps of driving a steering reaction force motor to apply a steering reaction force to a steering member of a vehicle in response to a steering action of the steering member applied by a driver; and driving a steering motor to apply a steering force to steer a vehicle wheel in accordance with the steering action of the steering member in a state where the vehicle wheel is mechanically disengaged from the steering member by controlling a switching actuator of a clutch device. In this method, an integrated value of a current supplied to one of the steering reaction force motor and the steering motor is obtained and utilized to determine whether or not one of the motors is in an overload state where the current supplied to one of the motors is higher than a threshold value. The steering motor is controlled to steer the vehicle wheel in a manner that follows at least a target steering angle which is calculated based on a steering angle of the steering member. Based on the determination of the overload state of one of the motors, the switching actuator of the clutch device is controlled to disengage the steering member and the vehicle wheel when the overload state of one of the motors is not detected, and the switching actuator of the clutch device is controlled to engage the steering member and the vehicle wheel when the overload state of one of the motors is detected.

In the first aspect of the disclosure, the current integrated value acquisition unit obtains the integrated value of a current supplied to one of the steering reaction force motor and the steering motor. The overload state determination unit determines whether or not the one of the motors is in an overload state based on the integrated value of the current supplied to the motor, obtained by the current integrated value acquisition unit. The control unit controls driving of the steering motor so that actual steering angle of the turning wheels follows at least a target steering angle which is calculated based on the steering angle of the steering member, and controls driving of the switching actuator so as to set the clutch device in an engaged state when the overload state determination unit determines that the one motor is in an overload state.

According to the study of the inventor, it is known that the integrated value of a current supplied to a motor is preferable as an index that indicates the load state of the motor. According to the first aspect of the disclosure, whether or not a motor (the steering reaction force motor or the steering motor) is in an overload state is determined based on the integrated value of the current that flows through the motor related to steering of the vehicle, and thus it is possible to reliably determine whether or not the motor related to steering of the vehicle is in an overload state. In addition, when the above-mentioned determination is made, a temperature sensor such as a thermistor is not needed, and thus the number of components and the cost are not increased.

A second aspect of the disclosure provides the vehicle steering device according to the first aspect of the disclosure in which the current integrated value acquisition unit obtains an integrated value of a current supplied to the steering reaction force motor, the overload state determination unit determines whether or not the steering reaction force motor is in an overload state based on the integrated value of the current supplied to the steering reaction force motor, obtained by the current integrated value acquisition unit, and when the overload state determination unit determines that the steering reaction force motor is in an overload state, the control unit controls driving of the switching actuator to set the clutch device in an engaged state.

In the second aspect of the disclosure, the current integrated value acquisition unit obtains an integrated value of the current supplied to the steering reaction force motor. The overload state determination unit determines whether or not the steering reaction force motor is in an overload state based on the integrated value of the current supplied to the steering reaction force motor, obtained by the current integrated value acquisition unit. When the overload state determination unit determines that the steering reaction force motor is in an overload state, the control unit controls driving of the switching actuator so as to set the clutch device in an engaged state.

According to the second aspect of the disclosure, whether or not the steering reaction force motor is in an overload state is determined based on the integrated value of the current supplied to the steering reaction force motor, and thus it is possible to reliably determine whether or not the steering reaction force motor is in an overload state. Similarly to the first aspect of the disclosure, when the above-mentioned determination is made, a temperature sensor such as a thermistor is not needed, and thus the number of components and the cost are not increased.

A third aspect of the disclosure provides the vehicle steering device according to the first aspect of the disclosure in which the current integrated value acquisition unit obtains an integrated value of a current supplied to the steering motor, the overload state determination unit determines whether or not the steering motor is in an overload state based on the integrated value of the current supplied to the steering motor, obtained by the current integrated value acquisition unit, and when the overload state determination unit determines that the steering motor is in an overload state, the control unit controls driving of the switching actuator to set the clutch device in an engaged state.

In the third aspect of the disclosure, the current integrated value acquisition unit obtains an integrated value of the current supplied to the steering motor. The overload state determination unit determines whether or not the steering motor is in an overload state based on the integrated value of the current supplied to the steering motor, obtained by the current integrated value acquisition unit. When the overload state determination unit determines that the steering motor is in an overload state, the control unit controls driving of the switching actuator so as to set the clutch device in an engaged state.

According to the third aspect of the disclosure, whether or not the steering motor is in an overload state is determined based on the integrated value of the current supplied to the steering motor, and thus it is possible to reliably determine whether or not the steering motor is in an overload state. Similarly to the first aspect of the disclosure, when the above-mentioned determination is made, a temperature sensor such as a thermistor is not needed, and thus the number of components and the cost are not increased.

A fourth aspect of the disclosure provides the vehicle steering device according to the first aspect of the disclosure in which the current integrated value acquisition unit obtains the integrated value of the current supplied to the one motor in following manner: in a time period in which a current higher than a current threshold value flows through the one motor, the current is integrated over time and in a time period in which a current lower than or equal to the current threshold value flows through the one motor, an integrated value of a current corresponding to a decrease in temperature in the time period is subtracted, the current threshold value serving as a reference for determining whether or not the one motor is heated.

In the fourth aspect of the disclosure, in consideration of the fact that the magnitude of the current supplied to a motor varies every moment, the current integrated value acquisition unit acquires an integrated value of the current supplied to the one of the motors in the following manner: in a time period in which a current higher than a current threshold value flows through the one motor, the current is integrated over time and in a time period in which a current lower than or equal to the current threshold value flows through the one motor, an integrated value a current corresponding to a decrease in temperature in the time period is subtracted, the current threshold value serving as a reference for determining whether or not the one motor may be heated.

According to the fourth aspect of the disclosure, when the integrated value of the current supplied to the one motor is obtained, the record of change related to increase/decrease in the magnitude of the current is reflected on the integrated value of the current, and thus it is possible to determine whether or not the one motor is in an overload state timely and more reliably compared with the first aspect of the disclosure. Similarly to the first aspect of the disclosure, when the above-mentioned determination is made, a temperature sensor such as a thermistor is not needed, and thus the number of components and the cost are not increased.

A fifth aspect of the disclosure provides the vehicle steering device according to the first aspect of the disclosure in which the control unit has at least steer-by-wire mode and assist mode as steering modes, the steer-by-wire mode in which the steering motor is driven to achieve a steering angle according to an operating state of the steering member and the steering reaction force motor is driven to apply a steering reaction force to the steering member according to a steering state of the steering unit when the clutch device is in a disengaged state, the assist mode in which at least one of the steering reaction force motor and the steering motor is driven to reduce an operating torque applied by a driver to the steering member when the clutch device is in an engaged state, and after the control unit controls driving of the switching actuator to set the clutch device in an engaged state, when the clutch device is in an engaged state, the control unit causes the steering reaction force motor to be deactivated and controls driving of the steering motor to reduce an operating torque applied by a driver to the steering member.

In the fifth aspect of the disclosure, after the control unit controls driving of the switching actuator so as to set the clutch device in an engaged state, when the clutch device is in an engaged state, the control unit causes the steering reaction force motor to be deactivated and controls driving of the steering motor so as to reduce the operating torque applied by a driver to the steering member.

According to the fifth aspect of the disclosure, when the clutch device is in an engaged state, the steering reaction force motor in an overload state is deactivated, and driving of the steering motor, which is less loaded than the steering reaction force motor, is controlled, and thus when the steering mode is assist mode, the operation of the steering member performed by a driver may be assisted using an appropriate motor from a viewpoint of load state.

A sixth aspect of the disclosure provides the vehicle steering device according to the first aspect of the disclosure in which the control unit has at least steer-by-wire mode and assist mode as steering modes, the steer-by-wire mode in which the steering motor is driven to achieve a steering angle according to an operating state of the steering member and the steering reaction force motor is driven to apply a steering reaction force to the steering member according to a steering state of the steering unit when the clutch device is in a disengaged state, the assist mode in which at least one of the steering reaction force motor and the steering motor is driven to reduce an operating torque applied by a driver to the steering member when the clutch device is in an engaged state, and after the control unit controls driving of the switching actuator to set the clutch device in an engaged state, when the clutch device is in an engaged state, the control unit causes the steering motor to be deactivated and controls driving of the steering reaction force motor to reduce an operating torque applied by a driver to the steering member.

In the sixth aspect of the disclosure, after the control unit controls driving of the switching actuator so as to set the clutch device in an engaged state, when the clutch device is in an engaged state, the control unit causes the steering motor to be deactivated and controls driving of the steering reaction force motor so as to reduce the operating torque applied by a driver to the steering member.

According to the sixth aspect of the disclosure, when the clutch device is in an engaged state, the steering motor in an overload state is deactivated, and driving of the steering reaction force motor, which is less loaded than the steering motor, is controlled, and thus when the steering mode is assist mode, the operation of the steering member performed by a driver may be assisted using an appropriate motor from a viewpoint of load state.

DESCRIPTION OF THE PREFERRED EMBODIMENTS

Figure 1:
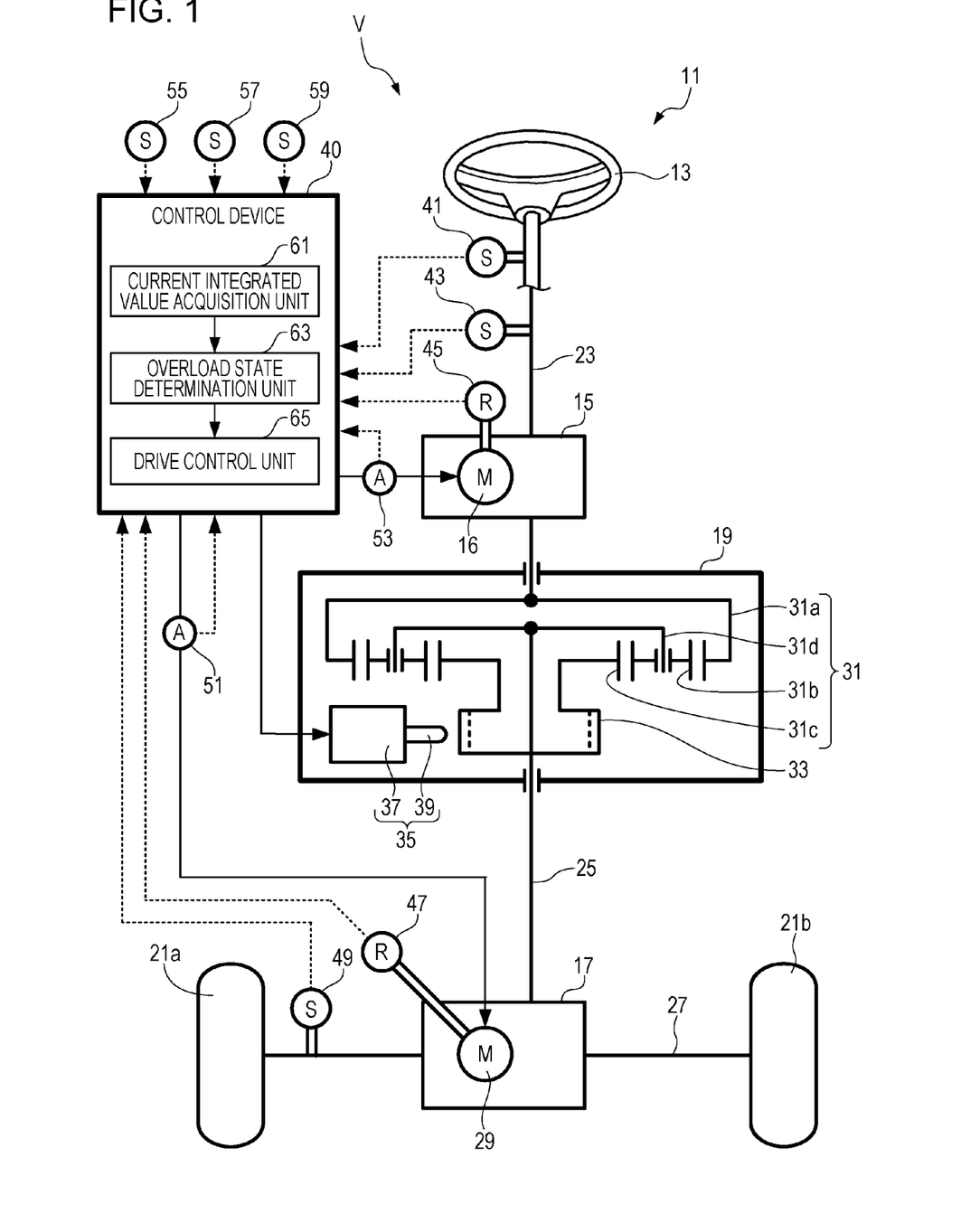
FIG. 1 is a schematic configuration diagram of a vehicle steering device according to an embodiment of the disclosure.

Hereinafter, an embodiment of the disclosure will be described in detail with reference to the accompanying drawings. FIG. 1 is a schematic configuration diagram of a vehicle steering device according to the embodiment of the disclosure. A vehicle steering device 11 is a steer-by-wire (SBW) type steering device. The vehicle steering device 11 has a function of generating a steering force (SBW mode) by driving the below-described steering motor 29, electronic power steering (EPS) function of generating an auxiliary force (EPS mode) applied to manual steering of a driver by driving the steering motor 29 for example at the time of a failure of the below-described steering reaction force motor 16, and a function of allowing manual steering (manual steering mode) of a driver for example at the time of a failure of the steering reaction force motor 16 and the steering motor 29.

In order to achieve the functions described above, the vehicle steering device 11 includes a steering wheel 13, a steering reaction force generating device 15, a steering device 17, and a clutch device 19 as illustrated in FIG. 1. The vehicle steering device 11 is mounted in a vehicle V. The vehicle V has a pair of steering wheels 21*a*, 21*b*.

The steering wheel 13 is a member that is operated according to a driver's intention related to steering. The steering wheel 13 corresponds to the "steering member" in the disclosure. The steering wheel 13 is provided with a steering shaft 23. The steering shaft 23 is designed to be rotated around the shaft according to an operation of the steering wheel 13 performed by a driver.

The steering reaction force generating device 15 has a function of generating a reaction force (response) to the hands of a driver who holds the steering wheel 13 when the vehicle steering device 11 is operated in SBW mode, the reaction force being in response to steering of the driver. The steering reaction force generating device 15 has a steering reaction force motor 16. The steering reaction force motor 16 is connected to a steering shaft 23. The steering reaction force motor 16 generates a steering torque for rotating the steering shaft 23 around the shaft. Thus, when the vehicle steering device 11 is in operation in SBW mode, a reaction force (response) in response to steering of a driver holding the steering wheel 13 is transmitted to the driver's hands. The steering wheel 13, the steering shaft 23, and the steering reaction force generating device 15 having the steering reaction force motor 16 correspond to the "steering unit" in the disclosure.

The steering device 17 has a function of converting rotary motion of a steering shaft 25 into linear motion of the rack shaft 27 via a rack and pinion mechanism (not illustrated). The steering device 17 has a steering motor 29. The steering motor 29 is connected to the steering shaft 25 and the rack shaft 27. The steering motor 29 generates a steering torque for causing the rack shaft 27 to move linearly along the axial direction. The rack shaft 27 is connected to a pair of turning wheels 21*a*, 21*b* via a tie rod which is not illustrated. The pair of turning wheels 21*a*, 21*b* is designed to be steered by the linear motion of the rack shaft 27. The steering device 17 having the steering shaft 25, the rack shaft 27, and the steering motor 29 corresponds to the "steering unit" in the disclosure.

The clutch device 19 has the function of engaging and disengaging connection between the steering shaft 23 and the steering shaft 25. In order to achieve such a function, the clutch device 19 includes a planetary gear mechanism 31. The planetary gear mechanism 31 includes an internal gear 31a, a planetary gear 31b, a sun gear 31c, and a planetary carrier 31d.

The clutch device 19 also includes a lock gear 33 and a locking device 35. The locking device 35 includes a locking pin 39 that is engaged with a groove of the lock gear 33, and an electromagnetic solenoid 37 that drives the locking pin 39.

The internal gear 31a is fixed to a lateral end of the steering device 17 of the steering shaft 23 so as to rotate integrally with the steering shaft 23. The sun gear 31c is designed to freely rotate around the rotational axis of the steering shaft 25. The planetary gear 31b is provided in plural number so as to be engaged with each of the sun gear 31c and the internal gear 31a. Each planetary gear 31b is pivotally supported on the planetary carrier 31d that rotates integrally with the steering shaft 25.

The lock gear 33 is an external gear. The lock gear 33 is designed to rotate integrally with the sun gear 31c. The locking pin 39 is urged by an urging unit (not illustrated) in the direction closer to the lock gear 33. When the locking pin 39 is engaged with a groove of the lock gear 33, rotary motion of the lock gear 33 is regulated. With supply of excitation current, the electromagnetic solenoid 37 displaces the locking pin 39 so as to be retracted, thereby releasing the engagement between the locking pin 39 and the lock gear 33. The electromagnetic solenoid 37 corresponds to the "switching actuator" in the disclosure. The locking device 35 is designed to operate according to a control signal sent from a control device 40. The control device 40 supplies excitation current to the electromagnetic solenoid 37, thereby releasing the engagement of the locking pin 39 with the lock gear 33.

Next, the operation of the clutch device 19 will be described. When the locking pin 39 is engaged with a groove of the lock gear 33, rotary motion of the sun gear 31c, which rotates integrally with the lock gear 33, is regulated. When a driver operates the steering wheel 13 with the rotary motion of the sun gear 31c regulated, the internal gear 31a rotates as the steering shaft 23 rotates. Since the rotary motion of the sun gear 31c is regulated at this point, the planetary gear 31b revolves around the sun gear 31c while rotating. The revolution of the planetary gear 31b causes the planetary carrier 31d and the steering shaft 25 to rotate, the planetary carrier 31d pivotally supporting the planetary gear 31b, the steering shaft 25 rotating integrally with the planetary carrier 31d.

In short, with the locking pin 39 engaged with a groove of the lock gear 33, the clutch device 19 is in an engaged state to connect between the steering shaft 23 and the steering shaft 25. At this point, the rotational force of the steering shaft 23 is transmitted to the steering shaft 25.

On the other hand, when engagement of the locking pin 39 with the groove of the lock gear 33 is released, the sun gear 31c, which rotates integrally with the lock gear 33, is in a freely rotatable state. When a driver operates the steering wheel 13 with the sun gear 31c freely rotatable, the internal gear 31a rotates as the steering shaft 23 rotates. At this point, the planetary gear 31b starts to revolve around the sun gear 31c while rotating. However, the planetary carrier 31d is connected to the turning wheels 21a, 21b via the steering shaft 25 and the rack shaft 27. For this reason, the resistance to the rotation of the planet carrier 31d is much higher than the resistance to the rotation of the sun gear 31c that is in a freely rotatable state. Therefore, when the planetary gear 31b rotates, the sun gear 31c rotates and the planetary carrier 31d does not rotate. That is, the steering shaft 25 does not rotate.

In short, with the locking pin 39 released from the groove of the lock gear 33, the clutch device 19 is in a disengaged state to release connection between the steering shaft 23 and the steering shaft 25. At this point, the rotational force of the steering shaft 23 is not transmitted to the steering shaft 25.

Next, the input/output system to the control device 40 will be described. The control device 40 is connected to an input system that includes a steering angle sensor 41, a steering torque sensor 43, a steering reaction force motor resolver 45, a steering motor resolver 47, a rack stroke sensor 49, a steering reaction force motor current sensor 51, a steering motor current sensor 53, a vehicle speed sensor 55, a yaw rate sensor 57, and an acceleration sensor 59.

The steering angle sensor 41 and the steering torque sensor 43 are provided in the steering shaft 23. The steering angle sensor 41 detects a steering angle of the steering wheel 13 made by a driver, and sends the detected steering angle information to the control device 40. The steering torque sensor 43 detects a steering torque applied by a driver to the steering wheel 13, and sends the detected steering torque information to the control device 40.

The steering reaction force motor resolver 45 is provided in the steering reaction force motor 16. The steering reaction force motor resolver 45 detects an amount of rotational operation (steering angle) of the steering reaction force motor 16, and sends the detected steering angle information to the control device 40.

The steering motor resolver 47 is provided in the steering motor 29. The steering motor resolver 47 detects an amount of rotational operation (steering angle) of the steering motor 29, and sends the detected steering angle information to the control device 40.

The rack stroke sensor 49 is provided in the rack shaft 27. The rack stroke sensor 49 detects an amount of linear movement (steering angle) of the rack shaft 27, and sends the detected steering angle information to the control device 40.

The steering reaction force motor current sensor 51 detects a steering reaction force motor current supplied to the steering reaction force motor 16, and sends the detected steering reaction force motor current information to the control device 40.

The steering motor current sensor 53 detects a steering motor current supplied to the steering motor 29, and sends the detected steering motor current information to the control device 40.

The vehicle speed sensor 55 detects a speed (vehicle speed) of the vehicle V, and sends the detected vehicle speed information to the control device 40. The yaw rate sensor 57 detects a yaw rate of vehicle V, and supplies the detected yaw rate information to the control device 40. The acceleration sensor 59 detects a lateral acceleration (lateral G) and a longitudinal acceleration (longitudinal G) of the vehicle V, and sends the detected lateral G information and longitudinal G information to the control device 40.

The control device 40 is connected to an output system that includes the steering reaction force motor 16, the steering motor 29, and the electromagnetic solenoid 37.

The control device 40 has a function of determining an operation mode of the vehicle steering device 11, a function of generating a control signal for controlling the driving of the steering reaction force motor 16, the steering motor 29, and the electromagnetic solenoid 37 according to the determined mode, and a function of controlling the driving of the steering reaction force motor 16, the steering motor 29, and the electromagnetic solenoid 37 according to the generated control signal, the operation mode being determined to one of SBW mode, EPS mode, and Manual Steering mode based on detection signals inputted via the input system and abnormality diagnosis results related to various constituent members of the vehicle steering device 11.

When the vehicle steering device 11 is in operation in SBW mode, the control device 40 controls driving of the steering reaction force motor 16 so as to transmit an appropriate reaction force (response) to a driver's hands, the reaction force being in response to steering of the driver.

In addition, when the vehicle steering device 11 is in operation in SBW mode, the control device 40 controls driving of the steering motor 29, thereby steering the turning wheels 21a, 21b according to a driver's intention.

Furthermore, the control device 40 has a function of obtaining an integrated value (integrated value over time) of motor current to be supplied to each of the motors (the steering reaction force motor 16 and the steering motor 29) related to steering of the vehicle V, and a function of determining whether or not the steering reaction force motor 16 or the steering motor 29 is in an overload state, based on the integrated value of motor current according to the steering reaction force motor 16 and the steering motor 29.

In more detail, the control device 40 includes a current integrated value acquisition unit 61, an overload state determination unit 63, and a drive control unit 65.

The current integrated value acquisition unit 61 has a function of obtaining an integrated value of the steering reaction force motor current that flows through the steering reaction force motor 16, and an integrated value of the steering motor current that flows through the steering motor 29. In more detail, the current integrated value acquisition unit 61 acquires an integrated value (hereinafter referred to as a "steering motor current integrated value") IA of, for example, the motor current supplied to the steering motor 29 in the following manner: in a time period in which a current higher than a current threshold value Ath flows through the steering motor 29, the current is integrated over time and in a time period in which a current lower than or equal to the current threshold value Ath flows through the steering motor 29, an integrated value of a current corresponding to a decrease in temperature in the time period is subtracted, the current threshold value Ath serving as a reference for determining whether or not the steering motor 29 may be heated. The details of this will be described later.

The overload state determination unit 63 has a function of determining whether or not the steering reaction force motor 16 is in an overload state based on an integrated value (hereinafter referred to as "steering reaction force motor current integrated value") of the motor current supplied to the steering reaction force motor 16 and of determining whether or not the steering motor 29 is in an overload state based on the steering motor current integrated value IA. In more detail, the overload state determination unit 63, for example when determining whether or not the steering motor 29 is in an overload state, determines whether or not the steering motor current integrated value IA is higher than a predetermined current integrated value threshold value IAth, and when the steering motor current integrated value IA is higher than the predetermined current integrated value threshold value IAth as a result of the determination, the overload state determination unit 63 determines that the steering motor 29 is in an overload state. The details of this will be described later.

The drive control unit 65 has a function of controlling the driving of the electromagnetic solenoid 37 so as to set the clutch device 19 in an engaged state when the overload state determination unit 63 determines that one of the steering reaction force motor 16 and the steering motor 29 is in an overload state. In more detail, the drive control unit 65 has a function of controlling the driving of the electromagnetic solenoid 37 so as to change the state of the clutch device 19 from a disengaged state (SBW mode) to an engaged state (non-SBW mode) for example when the overload state determination unit 63 determines that the steering motor 29 is in an overload state.

Next, the operation of the control device 40 in SBW mode as the steering mode of the vehicle steering device 11 will be described with reference to FIG. 2 by taking an example in which whether or not the steering motor 29 out of the motors (the steering reaction force motor 16 and the steering motor 29) related to steering of the vehicle V is in an overload state is determined.

Figure 2:
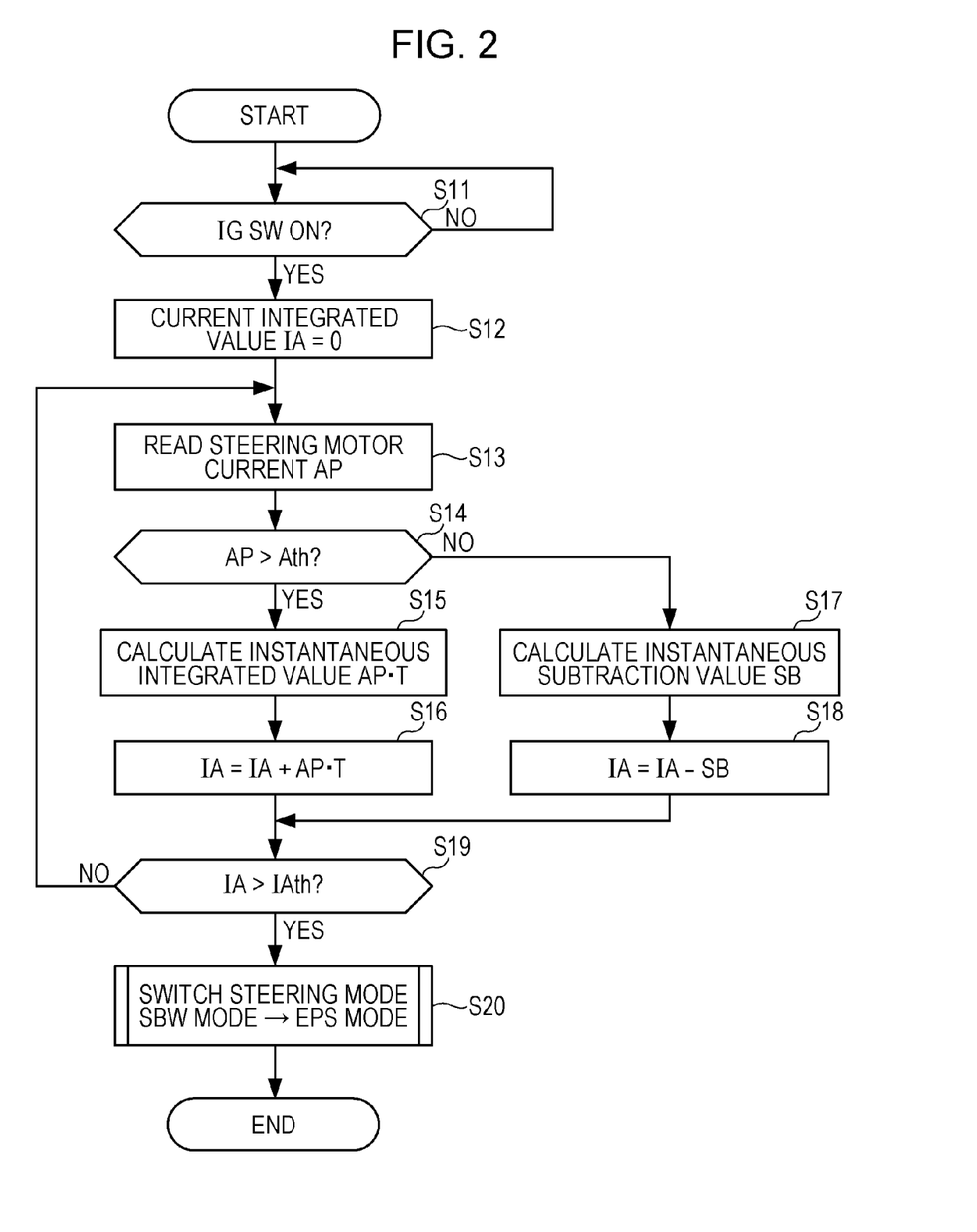
FIG. 2 is a flow chart illustrating the operation of a control device in SBW mode that is a steering mode of the vehicle steering device according to the embodiment of the disclosure.

In step S11 of FIG. 2, the control device 40 determines whether or not an ignition switch (IG SW) has been turned on. When it is determined in step S11 that the ignition switch has not been turned on ("No" in step S11), the control device 40 allows the determination processing in step S11 to be repeated. On the other hand, when it is determined in step S11 that the ignition switch has been turned on ("Yes" in step S11), the control device 40 allows the processing flow to proceed to next step S12.

In step S12, the control device 40 initializes the steering motor current integrated value IA which is stored in a storage unit such as an internal register to "0".

In step S13, the current integrated value acquisition unit 61 of the control device 40 reads a steering motor current AP detected by the steering motor current sensor 53. The processing in step S13 to step S19 is repeatedly performed with a predetermined period (cycle time) T until determination of "Yes" is made in step S19 described later.

In step S14, the current integrated value acquisition unit 61 of the control device 40 determines whether or not the steering motor current AP read in step S13 is higher than the current threshold value Ath that serves as a reference for determining whether or not the steering motor 29 may be heated. The current threshold value Ath may be appropriately defined experimentally based on a certain steering motor current AP for which the temperature of the main body of the steering motor 29 starts to increase for example under the condition that the steering motor current AP is supplied to the steering motor 29 while being gradually increased. When the steering motor current AP is determined to be higher than the current threshold value Ath as a result of the determination in step S14, the control device 40 causes the processing flow to proceed to next step S15. On the other hand, when the steering motor current AP is determined to be lower than or equal to the current threshold value Ath as a result of the determination in step S14, the control device 40 causes the processing flow to proceed to step S17.

In step S15, the current integrated value acquisition unit 61 of the control device 40 calculates an instantaneous integrated value AP·T by multiplying the steering motor current AP read in step S13 by the predetermined period (cycle time) T. The instantaneous integrated value AP·T corresponds to the integrated value of the steering motor current AP over time.

In step S16, the current integrated value acquisition unit 61 of the control device 40 calculates the steering motor current integrated value IA in the current cycle time by adding the instantaneous integrated value AP·T obtained in step S15 to the steering motor current integrated value IA in the last cycle time.

On the other hand, in step S17, the current integrated value acquisition unit 61 of the control device 40 calculates an instantaneous subtraction value SB by converting the steering motor current AP read in step S13 to the instantaneous subtraction value SB corresponding to temperature decrease in the current cycle time.

In step S18, the current integrated value acquisition unit 61 of the control device 40 subtracts the instantaneous subtraction value SB calculated in step S17 from the steering motor current integrated value IA in the last cycle, thereby calculating the steering motor current integrated value IA that reflects the record of temperature decrease in the current cycle time. This is intended to improve the accuracy of the steering motor current integrated value IA by calculating the steering motor current integrated value IA in consideration of fall (temperature decrease) of the temperature of the main body of the steering motor 29 when the steering motor current AP read in step S13 is supplied to the steering motor 29.

In step S19, the overload state determination unit 63 of the control device 40 determines whether or not the steering motor current integrated value IA calculated in step S16 or S18 is higher than the predetermined current integrated value threshold value IAth. It is to be noted that the current integrated value threshold value IAth may be appropriately defined experimentally based on a certain steering motor current integrated value IA for which the temperature of the main body of the steering motor 29 reaches a critical heat proof temperature under the condition that the steering motor current integrated value IA is gradually increased. When the steering motor current integrated value IA calculated in step S16 or S18 is determined to be higher than the current integrated value threshold value IAth as a result of the determination in step S19, the control device 40 causes the processing flow to proceed to next step S20. On the other hand, when the steering motor current integrated value IA calculated in step S16 or S18 is determined to be lower than or equal to the current integrated value threshold value IAth, the control device 40 causes the processing flow to return to step S13, the subsequent processing is performed successively.

In step S20, the drive control unit 65 of the control device 40 controls driving of the electromagnetic solenoid 37 so as to change the state of the clutch device 19 from a disengaged state (SBW mode) to an engaged state (non-SBW mode). Subsequently, the control device 40 terminates the flow of a series of processing steps.

Operational Effect of Vehicle Steering Device 11
According to Embodiment of Present Disclosure The vehicle steering device 11 according to a first aspect of the disclosure includes: a steering reaction force generating device (steering reaction unit) 15 that has a steering reaction force motor 16 capable of applying a steering reaction force to a steering wheel (steering member) 13 which is operated when turning wheels 21a, 21b of a vehicle V are turned; a steering device (steering unit) 17 that has a steering motor 29 that applies a steering force for steering the turning wheels 21a, 21b, the steering motor 29 being capable of steering the turning wheels 21a, 21b in a state where the steering device 17 is mechanically separated from the steering reaction force generating device (steering reaction unit) 15; a clutch device 19 that has an electromagnetic solenoid (switching actuator) 37 that sets the steering reaction force generating device (steering reaction unit) 15 and the steering device (steering unit) 17 in a mechanically engaged state or disengaged state; a current integrated value acquisition unit 61 that obtains an integrated value of a current supplied to one of the steering reaction force motor 16 and the steering motor 29; an overload state determination unit 63 that determines whether or not the one motor is in an overload state based on the integrated value of the current supplied to the one motor, obtained by the current integrated value acquisition unit 61; and a drive control unit (control unit) 65 that controls driving of the steering motor 29 to cause an actual steering angle of the turning wheels 21a, 21b to follow at least a target steering angle which is calculated based on a steering angle of the steering wheel (steering member) 13, and controls driving of the electromagnetic solenoid (switching actuator) 37 to set the clutch device 19 in an engaged state when the overload state determination unit 63 determines that the one motor is in an overload state.

In the vehicle steering device 11 according to the first aspect, the current integrated value acquisition unit 61 obtains the integrated value of the current supplied to one of the steering reaction force motor 16 and the steering motor 29. The overload state determination unit 63 determines whether or not the one of the motors is in an overload state based on the integrated value of the current supplied to the motor, obtained by the current integrated value acquisition unit 61. The drive control unit (control unit) 65 controls driving of the steering motor 29 so that actual steering angle of the turning wheels 21a, 21b follows at least a target steering angle which is calculated based on the steering angle of the steering wheel (steering member) 13, and controls driving of the electromagnetic solenoid (switching actuator) 37 so as to set the clutch device 19 in an engaged state when the overload state determination unit 63 determines that the one motor is in an overload state.

According to the study of the inventor, it is known that the integrated value of a current supplied to a motor is preferable as an index that indicates the load state of the motor. In the vehicle steering device 11 according to the first aspect, whether or not a motor (the steering reaction force motor 16 or the steering motor 29) is in an overload state is determined based on the integrated value of the current that flows through the motor related to steering of the vehicle V, and thus it is possible to reliably determine whether or not the motor related to steering of the vehicle V is in an overload state. In addition, when the above-mentioned determination is made, a temperature sensor such as a thermistor is not needed, and thus the number of components and the cost are not increased.

The vehicle steering device 11 according to the second aspect of the disclosure provides the vehicle steering device 11 according to the first aspect and may adopt a configuration in which the current integrated value acquisition unit 61 obtains an integrated value of a current supplied to the steering reaction force motor 16, the overload state determination unit 63 determines whether or not the steering reaction force motor 16 is in an overload state based on the integrated value of the current supplied to the steering reaction force motor 16, obtained by the current integrated value acquisition unit 61, and when the overload state determination unit 63 determines that the steering reaction force motor 16 is in an overload state, the drive control unit (control unit) 65 controls driving of the electromagnetic solenoid (switching actuator) 37 to set the clutch device 19 in an engaged state.

In the vehicle steering device 11 according to the second aspect, the current integrated value acquisition unit 61 obtains an integrated value of the current supplied to the steering reaction force motor 16. The overload state determination unit 63 determines whether or not the steering reaction force motor 16 is in an overload state based on the integrated value of the current supplied to the steering reaction force motor 16, obtained by the current integrated value acquisition unit 61. When the overload state determination unit 63 determines that the steering reaction force motor 16 is in an overload state, the drive control unit (control unit) 65 controls driving of the electromagnetic solenoid (switching actuator) 37 so as to set the clutch device 19 in an engaged state.

With the vehicle steering device 11 according to the second aspect, whether or not the steering reaction force motor 16 is in an overload state is determined based on the integrated value of the current supplied to the steering reaction force motor 16, and thus it is possible to reliably determine whether or not the steering reaction force motor 16 is in an overload state. Similarly to the vehicle steering device 11 according to the first aspect, when the above-mentioned determination is made, a temperature sensor such as a thermistor is not needed, and thus the number of components and the cost are not increased.

The vehicle steering device 11 according to the third aspect of the disclosure provides the vehicle steering device 11 according to the first aspect and may adopt a configuration in which the current integrated value acquisition unit 61 obtains an integrated value of a current supplied to the steering motor 29, the overload state determination unit 63 determines whether or not the steering motor 29 is in an overload state based on the integrated value of the current supplied to the steering motor 29, obtained by the current integrated value acquisition unit 61, and when the overload state determination unit 63 determines that the steering motor 29 is in an overload state, the drive control unit (control unit) 65 controls driving of the electromagnetic solenoid (switching actuator) 37 to set the clutch device 19 in an engaged state.

In the vehicle steering device 11 according to the third aspect, the current integrated value acquisition unit 61 obtains an integrated value of the current supplied to the steering motor 29. The overload state determination unit 63 determines whether or not the steering motor 29 is in an overload state based on the integrated value of the current supplied to the steering motor 29, obtained by the current integrated value acquisition unit 61. When the overload state determination unit 63 determines that the steering motor 29 is in an overload state, the drive control unit (control unit) 65 controls driving of the electromagnetic solenoid (switching actuator) 37 so as to set the clutch device 19 in an engaged state.

In the vehicle steering device 11 according to the third aspect, whether or not the steering motor 29 is in an overload state is determined based on the integrated value of the current supplied to the steering motor 29, and thus it is possible to reliably determine whether or not the steering motor 29 is in an overload state. Similarly to the vehicle steering device 11 according to the first aspect, when the above-mentioned determination is made, a temperature sensor such as a thermistor is not needed, and thus the number of components and the cost are not increased.

The vehicle steering device 11 according to the fourth aspect of the disclosure provides the vehicle steering device 11 according to the first aspect and may adopt a configuration in which the current integrated value acquisition unit 61 obtains the integrated value of the current supplied to the one motor in following manner: in a time period in which a current higher than a current threshold value flows through the one motor, the current is integrated over time and in a time period in which a current lower than or equal to the current threshold value flows through the one motor, an integrated value of a current corresponding to a decrease in temperature in the time period is subtracted, the current threshold value serving as a reference for determining whether or not the one motor is heated.

In the vehicle steering device 11 according to the fourth aspect, in consideration of the fact that the magnitude of the current supplied to a motor varies every moment, the current integrated value acquisition unit 61 acquires an integrated value of the current supplied to the one of the motors in the following manner: in a time period in which a current higher than a current threshold value flows through the one motor, the current is integrated over time and in a time period in which a current lower than or equal to the current threshold value flows through the one motor, an integrated value a current corresponding to a decrease in temperature in the time period is subtracted, the current threshold value serving as a reference for determining whether or not the one motor may be heated.

In the vehicle steering device 11 according to the fourth aspect, when the integrated value of the current supplied to the one motor is obtained, the record of change related to increase/decrease in the magnitude of the current is reflected on the integrated value of the current, and thus it is possible to determine whether or not the one motor is in an overload state timely and more reliably compared with the vehicle steering device 11 according to the first aspect. Similarly to the vehicle steering device 11 according to the first aspect, when the above-mentioned determination is made, a temperature sensor such as a thermistor is not needed, and thus the number of components and the cost are not increased.

The vehicle steering device 11 according to the fifth aspect of the disclosure provides the vehicle steering device 11 according to the second aspect and may adopt a configuration in which the drive control unit (control unit) 65 has at least steer-by-wire mode and assist mode as steering modes, the steer-by-wire mode in which the steering motor 29 is driven to achieve a steering angle according to an operating state of the steering wheel (steering member) 13 and the steering reaction force motor 16 is driven to apply a steering reaction force to the steering member according to a steering state of the steering device (steering unit) 17 when the clutch device 19 is in a disengaged state, the assist mode in which at least one of the steering reaction force motor 16 and the steering motor 29 is driven to reduce an operating torque applied by a driver to the steering wheel (steering member) 13 when the clutch device 19 is in an engaged state, and after the drive control unit 65 controls driving of the electromagnetic solenoid (switching actuator) 37 to set the clutch device in an engaged state, when the clutch device 19 is in an engaged state, the drive control unit 65 causes the steering reaction force motor 16 to be deactivated (including both cases where a motor current supplied to the steering reaction force motor 16 is stopped and where the motor current is reduced lower than normal current) and controls driving of the steering motor 29 to reduce an operating torque applied by a driver to the steering wheel (steering member) 13.

In the vehicle steering device 11 according to the fifth aspect, after the drive control unit (control unit) 65 controls driving of the electromagnetic solenoid (switching actuator) 37 so as to set the clutch device 19 in an engaged state, when the clutch device 19 is in an engaged state, the drive control unit (control unit) 65 causes the steering reaction force motor 16 to be deactivated and controls driving of the steering motor 29 so as to reduce the operating torque applied by a driver to the steering wheel (steering member) 13.

In the vehicle steering device 11 according to the fifth aspect, when the clutch device 19 is in an engaged state, the steering reaction force motor 16 in an overload state is deactivated, and driving of the steering motor 29, which is less loaded than the steering reaction force motor 16, is controlled, and thus when the steering mode is assist mode, the operation of the steering member performed by a driver may be assisted using an appropriate motor (the steering motor 29) from a viewpoint of load state.

The vehicle steering device 11 according to the sixth aspect of the disclosure provides the vehicle steering device 11 according to the third aspect and may adopt a configuration in which the drive control unit (control unit) 65 has at least steer-by-wire mode and assist mode as steering modes, the steer-by-wire mode in which the steering motor 29 is driven to achieve a steering angle according to an operating state of the steering wheel (steering member) 13 and the steering reaction force motor 16 is driven to apply a steering reaction force to the steering member according to a steering state of the steering device (steering unit) 17 when the clutch device 19 is in a disengaged state, the assist mode in which at least one of the steering reaction force motor 16 and the steering motor 29 is driven to reduce an operating torque applied by a driver to the steering wheel (steering member) 13 when the clutch device 19 is in an engaged state, and after the drive control unit 65 controls driving of the electromagnetic solenoid (switching actuator) 37 to set the clutch device in an engaged state, when the clutch device 19 is in an engaged state, the drive control unit 65 causes the steering motor 29 to be deactivated (including both cases where a motor current supplied to the steering motor 29 is stopped and where the motor current is reduced lower than normal current) and controls driving of the steering reaction force motor 16 to reduce an operating torque applied by a driver to the steering wheel (steering member) 13.

In the vehicle steering device 11 according to the sixth aspect, after the drive control unit (control unit) 65 controls driving of the electromagnetic solenoid (switching actuator) 37 so as to set the clutch device 19 in an engaged state, when the clutch device 19 is in an engaged state, the drive control unit (control unit) 65 causes the steering motor 29 to be deactivated (including both cases where a motor current supplied to the steering motor 29 is stopped and where the motor current is reduced lower than normal current) and controls the steering reaction force motor 16 so as to reduce the operating torque applied by a driver to the steering wheel (steering member) 13.

In the vehicle steering device 11 according to the sixth aspect, when the clutch device 19 is in an engaged state, the steering motor 29 in an overload state is deactivated, and driving of the steering reaction force motor 16, which is less loaded than the steering motor 29, is controlled, and thus when the steering mode is assist mode, the operation of the steering wheel (steering member) 13 performed by a driver may be assisted using an appropriate motor (the steering reaction force motor 16) from a viewpoint of load state.

Other Embodiments

The embodiment described above is an example of implementation of the disclosure. Therefore, this should not be interpreted as limiting the technical scope of present disclosure. This is because the disclosure may be implemented in various forms without departing from the spirit and the main features of the disclosure.

For example, in the description of the embodiment of the disclosure, an example has been explained in which the clutch device 19 having the planetary gear mechanism 31 is provided. However, the disclosure is not limited to this example. The clutch device 19 may have any configuration as long as the configuration allows engagement and disengagement between the steering shaft 23 and the steering shafts 25.

In the description of the embodiment of the disclosure, the steering motor 29 has been explained by illustration as the motor related to steering of the vehicle. However, the disclosure is not limited to this example. The present disclosure may have a configuration in which only the steering reaction force motor 16 is used or the steering reaction force motor 16 in combination with the steering motor 29 is used as the motor related to steering of the vehicle V.

The maximum rated current characteristic of each motor (the steering reaction force motor 16 and the steering motor 29) related to steering of the vehicle V may have such a characteristic that the maximum rated current of the motor decreases as the integrated value of motor current increases.

What is claimed is:

1. A vehicle steering device comprising:
a steering member for steering a vehicle wheel;
a steering reaction force motor capable of applying a steering reaction force to the steering member in response to a steering action of the steering member by a driver;
a steering motor that applies a steering force to steer the vehicle wheel in accordance with the steering action of the steering member in a state where the vehicle wheel is mechanically disengaged from the steering member;
a clutch device that has a switching actuator that mechanically engages or disengages the steering member and the vehicle wheel; and
a control device that:
obtains an instantaneous integrated value of a current supplied to one of the steering reaction force motor and the steering motor in a manner in which: (i) in a time period in which a current higher than a current threshold value flows through said one of the steering reaction force motor and steering motor, the current is integrated over time; and (ii) in a time period in which a current lower than or equal to the current threshold value flows through said one of the steering reaction force motor and steering motor, an integrated value of a current corresponding to a decrease in temperature in the time period is subtracted, wherein the current threshold value serves as a reference for determining whether or not said one of the steering reaction force motor and steering motor is heated without a need of a temperature sensor, wherein the instantaneous integrated value of the current is based on a value calculated by multiplying the current by a predetermined cycle time, determines whether or not said one of the steering reaction force motor and the steering motor is in an overload state, determines that said one of the steering reaction force motor and the steering motor is in the overload state when the instantaneous integrated value of the current supplied to said one of the steering reaction force motor and steering motor is higher than a predetermined threshold value, based on the instantaneous integrated value obtained by the control device, controls the steering motor to steer the vehicle wheel in a manner that follows at least a target steering angle which is calculated based on the steering action of the steering member, and controls the switching actuator of the clutch device to engage the steering member and the vehicle wheel when the control device determines that said one of the steering reaction force motor and steering motor is in the overload state.

2. The vehicle steering device according to claim 1, wherein the control device has steering modes which comprise:

a steer-by-wire mode in which the steering motor is driven to steer the vehicle wheel by an angle according to the steering action of the steering member by the driver and the steering reaction force motor is driven to apply the steering reaction force to the steering member according to the steering action of the steering member by the driver when the clutch device disengages the steering member and the vehicle wheel; and an assist mode in which at least one of the steering reaction force motor and the steering motor is driven to reduce an operating torque required for the driver to operate the steering member when the clutch device engages the steering member and the vehicle wheel, wherein in the assist mode in which the clutch device engages the steering member and the vehicle wheel, the control device deactivates the steering reaction force motor and controls the steering motor to reduce the operating torque required for the driver to operate the steering member.

3. A method of controlling a vehicle steering device, the method comprising:

driving a steering reaction force motor to apply a steering reaction force to a steering member of a vehicle in response to a steering action of the steering member applied by a driver;

driving a steering motor to apply a steering force to steer a vehicle wheel in accordance with the steering action of the steering member in a state where the vehicle wheel is mechanically disengaged from the steering member by controlling a switching actuator of a clutch device;

obtaining, by a control device, an instantaneous integrated value of a current supplied to one of the steering reaction force motor and the steering motor in a manner in which: (i) in a time period in which a current higher than a current threshold value flows through said one of the steering reaction force motor and steering motor, the current is integrated over time; and (ii) in a time period in which a current lower than or equal to the current threshold value flows through said one of the steering reaction force motor and steering motor, an integrated value of a current corresponding to a decrease in temperature in the time period is subtracted, wherein the current threshold value serves as a reference for determining whether or not the steering motor is heated without a need of a temperature sensor, wherein the instantaneous integrated value of the current is based on a value calculated by multiplying the current by a predetermined cycle time;

utilizing, by the control device, the instantaneous integrated value of the current supplied to said one of the steering reaction force motor and steering motor to determine whether or not said one of the steering reaction force motor and steering motor is in an overload state;

determining, by the control device, that said one of the steering reaction force motor and steering motor is in the overload state when the instantaneous integrated value of the current supplied to said one of the steering reaction force motor and steering motor is higher than a predetermined threshold value;

controlling, by the control device, the steering motor to steer the vehicle wheel in a manner that follows at least a target steering angle which is calculated based on the steering action of the steering member; and controlling, by the control device, the switching actuator of the clutch device to engage the steering member and the vehicle wheel when the overload state of said one of the steering reaction force motor and steering motor is detected.

* * * * *